Figure 1:
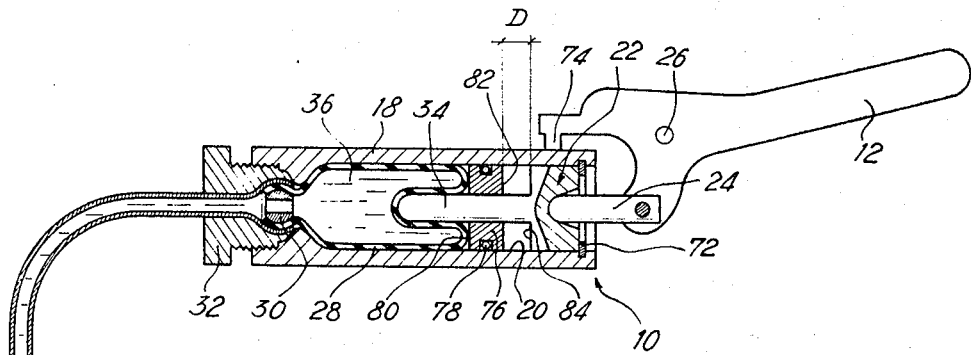
Figure 1:
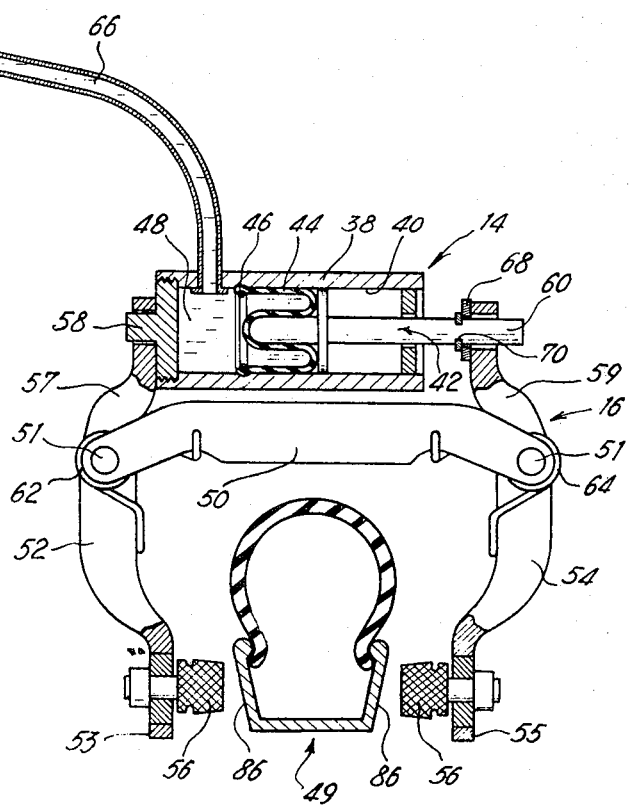

United States Patent [19]
Carre

[11] 3,899,057
[45] Aug. 12, 1975

[54] HYDRAULIC CONTROL CIRCUIT

[75] Inventor: Jean-Jacques Carre, Montreuil, France

[73] Assignee: Societe Anonyme D.B.A., Paris, France

[22] Filed: Feb. 22, 1974

[21] Appl. No.: 444,629

Related U.S. Application Data

[63] Continuation of Ser. No. 324,688, Jan. 18, 1973, abandoned.

[30] Foreign Application Priority Data

Jan. 25, 1972   France .............................. 72.02303

[52] U.S. Cl. ................. 188/351; 60/557; 188/71.8; 188/196 C; 188/344; 192/70.25; 192/111 A
[51] Int. Cl.² ......................................... B60T 11/16
[58] Field of Search ......... 188/24, 344, 351, 196 A, 188/196 P, 71.8, 196 C; 192/111 A, 20.25; 60/556, 557, 558

[56] References Cited
UNITED STATES PATENTS 3,064,765   11/1962   Dotto .............................. 188/196 P
3,338,337   8/1967   Freeland et al. ...................... 188/24

FOREIGN PATENTS OR APPLICATIONS 800,196   8/1958   United Kingdom ................. 188/344

Primary Examiner—George E. A. Halvosa
Attorney, Agent, or Firm—Ken C. Decker; William N. Antonis

[57] ABSTRACT

A cycle hydraulic braking system is disclosed, with a generating cylinder 10 and a receiving cylinder 14, the chamber 36 and chamber 48 for generating and receiving cylinder to communicate and define a fluid-tight enclosure filled with a predetermined volume of incompressible fluid the compensating piston 76 is coaxially mounted on generating piston 34, the compensating piston 76 is engaged by piston 34 when its forwards stroke is longer than the predetermined value D. A friction ring 78 maintains the compensating piston during the return stroke of piston 34 into its rest position in abutment with washer 72.

2 Claims, 2 Drawing Figures

HYDRAULIC CONTROL CIRCUIT

This is a continuation of application Ser. No. 324,688 filed Jan. 18, 1973, now abandoned.

The invention relates essentially to a hydraulic control circuit for use in brake or clutch devices for motor vehicles, cycles and motor cycles.

Known hydraulic control circuits comprise at least one pressure generating assembly of the piston-and-cylinder type whose pressure chamber is connected to the pressure chamber of at least one pressure receiving assembly of the piston-and-cylinder type to define a sealed compartment filled with incompressible liquid.

It is known that such circuits cannot be used effectively in force or torque transmitting devices comprising elements subject to relatively rapid wear, for example the friction members commonly used in brake or clutch devices. In particular, wear on brake linings or brake blocks introduces large clearances which rapidly reduce the efficiency of brake devices.

To overcome this disadvantage, hydraulic control circuits have been proposed in which the generating assembly is a conventional, well-known master cylinder in which the pressure chamber is connected to a hydraulic reservoir when the control circuit is idle, so as to permit replenishing with hydraulic fluid.

The invention relates to a hydraulic control circuit having a simpler design and lower cost price than the said circuits with conventional master cylinders, but having the same advantages in respect of use in a brake and clutch device having rapidly wearing elements.

According to the principal feature of the invention, a hydraulic control circuit comprising at least one pressure generating assembly of the piston-and-cylinder type whose pressure chamber is connected to the pressure chamber of at least one pressure receiving assembly of the piston-and-cylinder type to define a sealed compartment is characterized in that it also comprises at least one compensating assembly of the piston-and-cylinder type whose compensating chamber is connected to the sealed compartment to define a fluid-tight enclosure filled with a predetermined quantity of incompressible fluid, said compensating assembly comprising a compensating piston cable of being displaced towards the interior of the compensating chamber to reduce the volume thereof when the forward stroke of one of the pistons in the generating and receiving assemblies exceeds a predetermined value, the compensating piston cooperating by way of anti-return means with the cylinder of the compensating assembly so as to remain stationary relative to the latter cylinder during the return stroke of the said one of the piston in the generating and receiving assemblies.

According to a preferred embodiment of the invention, the compensating assembly is situated in one of the generating or receiving assemblies, and the compensating piston is coaxial with the associated piston and cooperates with the latter by way of a one-way thrust coupling with lost motion.

This particular arrangement makes it possible to reduce the number of components in the hydraulic control circuit.

Figure 2:
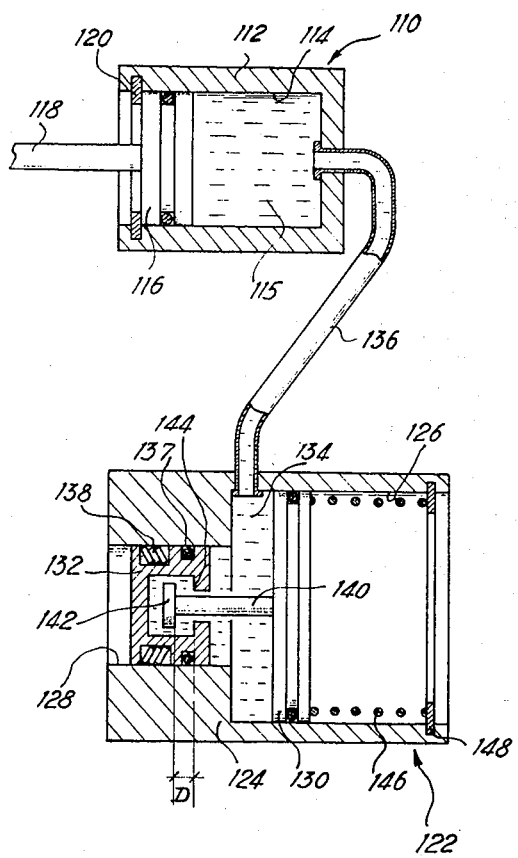

The invention will be better understood from the ensuing description referring to the accompanying drawings, in which:

FIG. 1 is a diagrammatic view, partly in section, of a hydraulic circuit embodying the invention and associated with a cycle brake device; and FIG. 2 is a diagrammatic view of another embodiment of the invention, partly in section.

The hydraulic control circuit shown in FIG. 1 consists essentially of a pressure generating assembly 10 operated by a brake actuating lever 12 and a pressure receiving assembly 14 capable of operating a brake mechanism 16.

The pressure generating assembly comprises a cylinder 18 attached to the cycle handlebar. The cylinder 18 contains a bore 20, at one end of which is slidably mounted a piston 22 suitably connected by a push rod 24 to the brake actuating lever 12, which is pivoted on a pin fixed to the handlebar. The bore 20 contains a flexible diaphragm 28 of elastomeric material in the form of a fingerstal. As the drawing shows, the edge of the diaphragm 18 is mounted in a fluid-tight manner at the other end of the bore 20 by means of a perforated ball or bead 30 and a threaded socket 32 screwed into the casing 18. The diaphragm 28 cooperates with an axial projection 34 on the piston 22 to define the pressure chamber 36 of the pressure generating assembly.

The pressure receiving assembly 14 comprises a casing 38 whose bore 40 contains a piston-forming assembly 42 and a flexible diaphragm 44 of elastomeric material whose edge cooperates in a fluid-tight manner with the surface of the bore, by way of an annular, radially expansible spring 46, to define the pressure chamber 48 of the receiving assembly.

The brake mechanism 16 consists essentially of a U-shaped yoke straddling a wheel 49 of the cycle (shown diagrammatically by means of a partial section) and made up of a bar 50 fixed to the cycle frame, and of two levers 52, 54 pivoted on each end of the bar 50 by means of pins 51. A brake block 56 fixed to one end 53, 55 of each lever is capable of cooperating in conventional fashion with friction surfaces 86 situated on each side of the wheel. The pressure receiving assembly 14 is mounted substantially parallel to the bar 50 between the other two ends 57, 59 of the levers 52, 54. To this end the lever ends 57, 59 contain two orifices which receive two projections 58, 60 provided on the casing 38 and piston 42 respectively. Two return torsion springs 62, 64 mounted on the pins 51 bias the levers 52, 54 so as to draw the brake blocks 56 off the friction surfaces 86 on the wheel 49.

The two pressure chambers 36 and 48 of the generating and receiving assemblies 10, 14 are connected in a fluid-tight manner by a tube 66 to define a sealed compartment which is filled with hydraulic fluid by way of a plugged orifice (not shown) on the casing 38.

As FIG. 1 shows, the return springs 62, 64 urge the piston 42 into the pressure chamber 48 by way of the lever ends 57, 59, the end of the casing 38, a thrust ring 68 provided for making the initial adjustment, and a stop washer 70 mounted on the rod of the piston 42.

The residual pressure prevailing in the chamber 48 and generated by the springs 62, 64 is transmitted to the chamber 36. The piston 22 is therefore pushed out of the casing 18 and on to a stop washer 72 attached to the casing. The same applies to the brake actuating lever 12, of which an abutment 74 comes to bear on the casing 18 when the control circuit is idle.

The control circuit also comprises a compensating assembly of which, as FIG. 1 shows, the cylinder is the casing 18 and the compensating piston is an annular sleeve 76 slidably mounted on the projection 34 on the piston 22. The inside face 80 of the compensating piston 76 cooperates with the flexible diaphragm 28, so that the compensating chamber coincides with the pressure chamber 36 of the generating assembly 10.

A fluid-tight enclosure filled with a predetermined volume of incompressible fluid is thus defined, including the pressures chambers of the generating, receiving and compensating assemblies.

The compensating piston 76 is provided with anti-return means in the form of a friction ring 78 housed in an annular groove on the periphery of the piston. The friction ring 78 is of the resilient type which expands radially to cooperate with the surface of the bore 20 by means of friction. Finally, during assembly of the control circuit, a clearance designated D in FIG. 1 is provided between the outside face 82 of the sleeve 78 (sic 76) and a shoulder 84 belonging to the piston 22.

The control circuit just described operates as follows.

Let us assume first that the outward stroke of the piston 22 is less than the clearance D defined above. Pivoting of the brake actuating lever by the rider causes the piston 22 to move towards the interior of the chamber 36, whereupon the piston 42 moves out of the chamber 48. Because of the geometry of the brake mechanism 16, the brake blocks 56 therefore come closer together, touch the friction surfaces 86 on the wheel 49 and brake the latter.

When the rider lets go of the brake actuating lever, the various components in the hydraulic circuit resume their idle position as shown in FIG. 1 due to the action of the return springs 62, 64.

Assuming now that due to wear on the brake blocks 56 the stroke of the piston 22 is greater than the clearance D, the compensating piston is moved towards the interior of the chamber 36 by the piston 22. When the rider lets go of the actuating lever the action of the springs 62, 64 causes the projection 34 on the piston 22 to be urged outwards along the cylinder 18, until the piston 22 resumes its idle position. However, the frictional forces between the surface of the bore 20 and the friction ring 79 are sufficient to hold the compensating piston 76 in the end position into which the piston 22 has pushed it.

Compared with the initial rest position, therefore, the effective volume of the chamber 36, that is, of the compensating chamber, has diminished and therefore the return stroke of the piston 42 is shorter. The springs 62, 64, of course, urge the levers 52, 54 off the wheel 49. In their new idle position, however, the distance separating the ends 53, 55 is smaller, and this compensates for the wear on the brake blocks 56.

It should be noted that the clearance D and the dimensions of the various elements of the generating assembly are selected so that before the control circuit is first operated the diaphragm 28 is just touching the inside face 80 of the compensating piston 76. When the brakes of the cycle are operated, therefore, the end of the diaphragm 28 is lifted by the projection 34 off the compensating piston 76, so that there is no risk of this piston being moved out from the chamber 36 as a result of reaction.

Variants (not shown) of the control circuit described above may include the following modifications:

1. The number of generating, receiving and compensating assemblies is varied according to the designer's wishes;
2. The return spring is fixed directly to the casing 38 and to the piston 42 of the pressure generating assembly 16;
3. The generating assembly 10 is provided with suitable seals between the two concentric piston 34, 76 instead of with a flexible diaphragm;
4. The compensating piston 76 cooperates with the casing 18 by way of other known anti-return means, for example an anti-return rack device, or by way of conical friction washers which are mounted on the periphery of the piston 76 and whose generatrices converge towards the interior of the pressure chamber 36.

It should be noted that disposing the compensating assembly in the pressure generating assembly as described makes it possible to obtain a hydraulic control circuit which is simple in design and easy to manufacture.

In another embodiment of the invention (not shown) the compensating assembly comprises a casing whose cylindrical bore is parallel to the bore of the cylinder of the pressure generating assembly. The compensating piston is mounted in its cylinder in a fluid-tight manner and cooperates with its cylinder by way of anti-return means permitting one-way motion of the piston towards the interior of the compensating chamber, the latter being connected in a fluid-tight manner to the pressure chamber of the generating assembly. Lastly, the member controlling the piston of the generating assembly is capable of moving the compensating piston into the compensating chamber when the stroke of the former piston exceeds a value D predetermined during assembly of the control circuit.

The control circuit illustrated diagrammatically in FIG. 2 has a generating assembly 110 in the form of a casing 112 in whose bore 114 a piston 116 is slidably mounted so as to define a pressure chamber 115 in this bore. The piston 116 is connected to a controlling member (not shown) by a push rod 118 and is capable of coming to bear on a stop 120 fixed to the casing 112.

The receiving assembly 122, which incorporates the compensating assembly, comprises a casing 124 containing a stepped bore with a large-diameter portion 126 and a small-diameter portion 128. The piston 130 of the receiving assembly is slidably mounted in a fluid-tight manner in the large-diameter portion 126, whereas a compensating piston is received in a fluid-tight manner by the small-diameter portion 128, so that a combined pressure chamber and compensating chamber 134 is defined between the two pistons. The two chambers 115, 134, which are connected by a tube 136, are filled with incompressible liquid by any known means and then define a fluid-tight enclosure The compensating piston 132 has on its periphery an O-ring seal 137 and a stack of conical friction washers 138 capable of cooperating with the surface of the stepped bore by means of friction. The conical washers are arranged so that their tops point into the chamber 134, with the result that motion of the piston 132 towards the interior of the chamber 134 requires much less force than motion of the piston out of the chamber 134.

The two pistons 130, 132 are connected by a thrust coupling with lost motion, formed by a projection 140 which is screwed into the piston 130 and has a flat head 142 capable of bearing on a radial annular projection 144 provided on the piston 132. For the lost motion a suitable clearance D is provided in this thrust coupling during assembly of the control circuit.

A helical spring 146 bearing on a washer 148 fixed to the casing 124 urges the piston into the chamber 134 to create a residual hydraulic pressure and to urge the piston 116 on to the ring 120. FIG. 2 shows all the elements of the circuit in their initial idle positions.

Operation of the control circuit just described is similar to that of the control circuit shown in FIG. 1 and will not be described in detail.

Since the stack of washers 138 prevents the piston 132 from moving out of the chamber 134 appreciably, operation of the piston 116 produces motion of the piston 130. When the latter is farther from its initial idle position than the clearance D, the head 142 is abutting on the annular projection 144, so that the compensating piston 132 is drawn into the chamber 134. When the controlling member 118 is released, therefore, the new idle position of the piston 132 is farther to the right in FIG. 2, than the initial idle position illustrated.

Other variants (not shown) of the control circuit shown in FIG. 2 have other anti-return means for the compensating piston, for example rack or ratchet devices or frictional devices selected so as to prevent appreciable movement of the piston 132 out of the chamber 134 when the pressure rises in this chamber.

I claim:

1. A hydraulic control circuit comprising at least one pressure generating assembly of the piston and cylinder type whose pressure chamber is connected to the pressure chamber of at least one pressure receiving assembly of the piston and cylinder type to define a sealed compartment; at least one compensating assembly of the piston and cylinder type whose compensating chamber is connected to the sealed compartment to define a fluid-tight enclosure filled with a predetermined quantity of incompressible fluid, said compensating assembly comprising a compensating piston capable of being displaced towards the interior of the compensating chamber to reduce the volume thereof when the forward stroke of one of the pistons in the generating and receiving assemblies exceeds a predetermined value, the compensating piston cooperating by way of anti-return means with the cylinder of the compensating assembly so as to remain stationary relative to the latter cylinder during the return stroke of the said one of the pistons in the generating and receiving assemblies, said compensating assembly being situated in one of the generating or receiving assemblies, the compensating piston being coaxial with said one of the pistons in the generating and receiving assemblies and cooperating with the latter by way of a one-way thrust coupling with lost motion, said generating assembly comprising a casing, an assembly of concentric pistons mounted in the bore of said casing in a fluid-tight manner, said assembly of concentric pistons comprising an annular compensating piston defining a central orifice slidably mounting an actuator piston connected to an intake controlling member, said intake controlling member belonging to the generating assembly and having a shoulder capable of abutting on the annular piston when the stroke of the actuator piston towards the interior of the pressure chamber of the generating assembly exceeds a predetermined value.

2. A hydraulic control circuit as claimed in claim 1 wherein fluid-tightness of the concentric piston assembly installation in the cylinder of the pressure generating assembly is ensured by a flexible diaphragm provided in the bore of the cylinder and cooperating with the cylinder to form the pressure chamber.

* * * * *